July 10, 1956     D. R. TRIPPLEHORN     2,753,625
METHOD AND APPARATUS FOR MAKING SPIRAL PARAFFIN SCRAPERS
Filed July 13, 1953     2 Sheets-Sheet 1
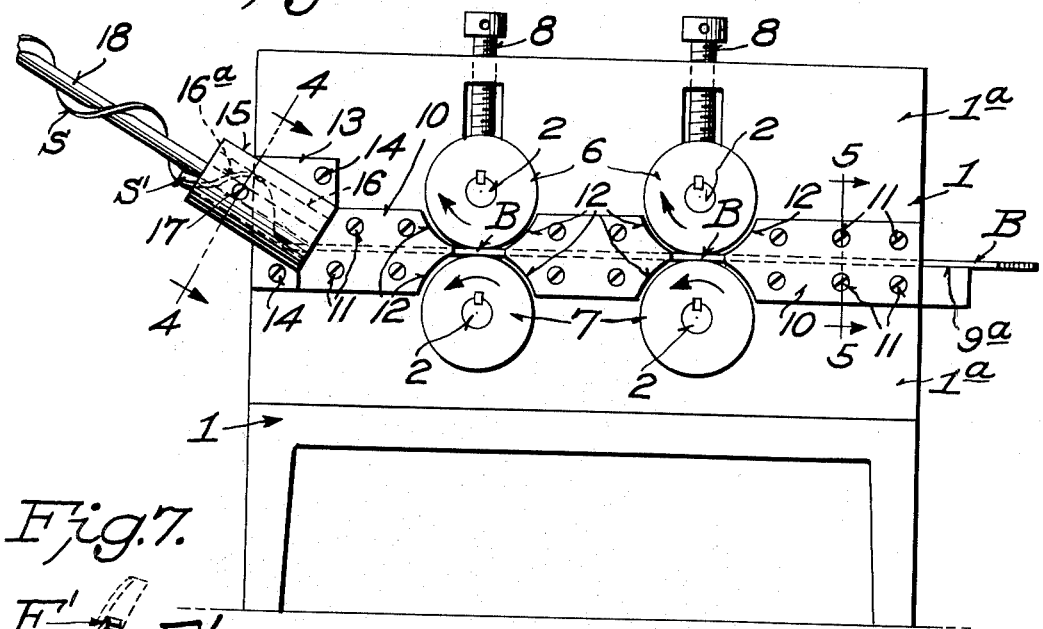
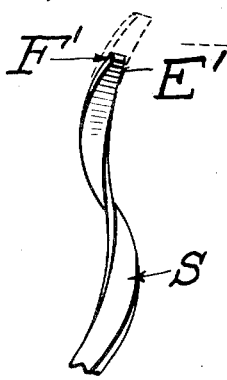
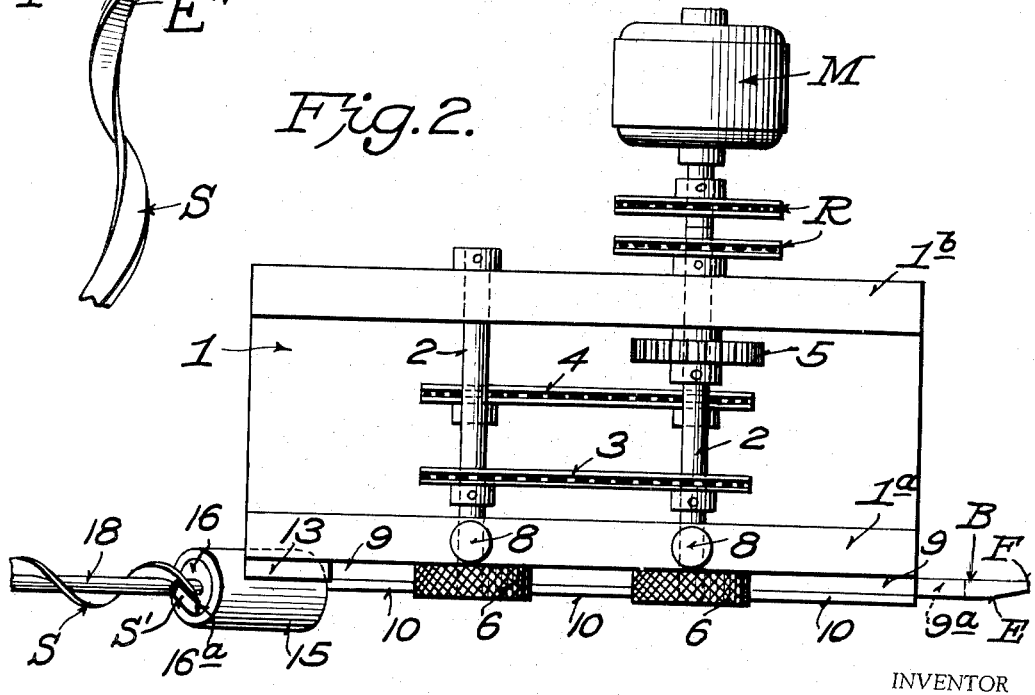
INVENTOR
DAVID R. TRIPPLEHORN,
BY *Alexander Powell*
ATTORNEYS

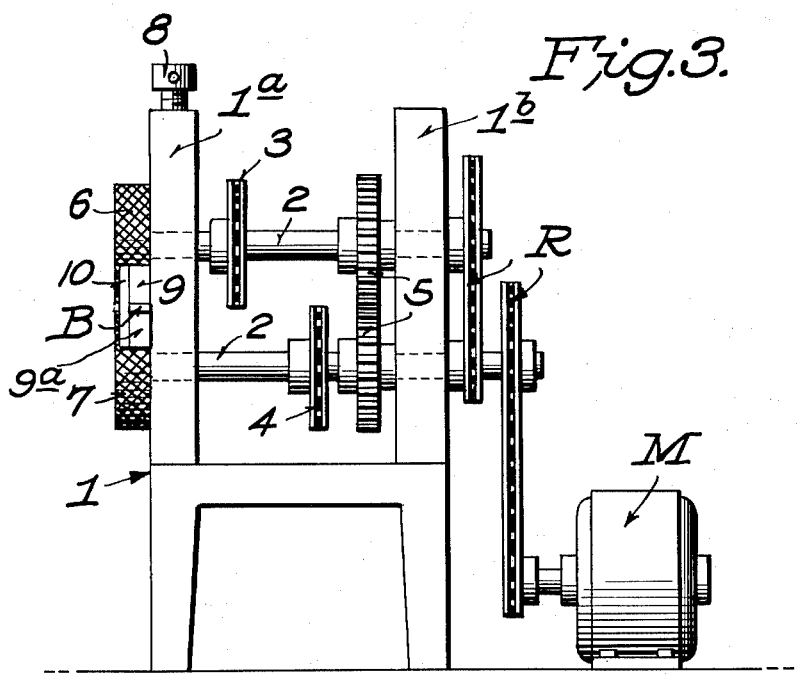

United States Patent Office 2,753,625
Patented July 10, 1956

2,753,625

METHOD AND APPARATUS FOR MAKING SPIRAL PARAFFIN SCRAPERS

David R. Tripplehorn, Fort Worth, Tex., assignor to James C. Tripplehorn, Pampa, Tex.

Application July 13, 1953, Serial No. 367,648

7 Claims. (Cl. 29—549)

My invention is a novel process and apparatus for making friction-grip spiral paraffin scrapers for use on oil well sucker rods. My process includes shearing bar stock into discrete lengths; extruding said discrete lengths through a helical die and simultaneously fairing the ends of the bar stock radially inwardly and also outwardly with respect to the axis of the helix; and finally heat-treating the shaped bar stock to provide the latter with spring steel characteristics.

The principal object of my invention is to provide a method of rapidly shaping the sheared bar stock into individual spiral paraffin scrapers, the process simultaneously providing each end of the spiral paraffin scraper with a preferred shape which serves the purpose of avoiding snagging of the ends of the scraper within the well wherein the latter is being used. My process also provides each spiral scraper with the correct inside diameter necessary to insure that the scraper will secure a tight grip on the sucker rod on which it is installed.

During the above mentioned shearing operation, the bar stock is not only cut into the proper lengths, each length being later formed into a spiral scraper, but at the same time during the shearing operation one edge of the bar stock is beveled at each end of each discrete length for the purpose hereinafter stated. It is, accordingly, a very important object of my invention to provide a shaping step wherein each discrete length of the bar stock is forced through an extrusion die with the beveled edge of the bar stock facing inwardly in the direction of the axis of the die whereby the outwardly-facing edge of the bar stock is faired inwardly toward the axis of the die in the vicinity of the ends of the stock opposite said beveled portions, thereby forming a spiral scraper wherein the outer edge of the scraper at each end thereof is faired inwardly toward the sucker rod on which the scraper is installed, and also the inner edge of each end of the scraper is faired outwardly away from the axis of the sucker rod. The outward fairing of the inner periphery of the scraper at its ends eliminates the tendency of the scraper ends to bite into the sucker rod, and also said outward fairing at the ends of the scraper prevents the scraper ends from contacting the rod, and thereby causes the grip of the scraper on the rod to take place intermediate the ends of the scraper, this structure tending to provide a uniform grip of the scraper on the rod along the full inner periphery of the scraper between its faired ends.

Another important object of my invention is to provide a process whereby all of the shaping of the scraper from the bar stock is performed in a single step and whereby the finished scraper is so shaped that the opposed side surfaces thereof are normal to the surface of the rod at the ends of the scraper as well as along the full length thereof. According to the prior art, scrapers of the type which frictionally grip the sucker rod have usually been provided with hooked ends or with ends which turn over to lie flat along the sucker rod. One disadvantage of this form of scraper is that the hooked ends tend to cause turbulence in the oil flowing past the scraper, and another disadvantage is that the hooked ends have a marked tendency to break off when subject to the high stresses and strains occurring within an oil well. As a result of an investigation to determine the reason for such end breakage, I have found that it is largely attributable to the complex bending of the ends of the bar stock during the shaping operation of the scraper. Heretofore the helical shape of the scraper has generally been formed by the extrusion of bar stock through a helical die, after which the ends of the scraper were subsequently bent around to form either a hooked end or else to form an end which lies flat along the sucker rod, the end-forming involving additional steps in the process. Such complex bending of the ends, after the helical forming operation, overworks the grain structure of the annealed bar stock and thereby creates hidden fractures or strains which weaken the ends of the spiral scraper and contribute to breakage thereof during use. It is therefore an important object of my process not only to provide a more desirable shape at each end of the formed scraper but also to eliminate the additional bending steps required to form the hooked portion at each end of the scraper, thereby providing a process wherein all of the bending of the paraffin scraper is done in a single extrusion step.

Another important object of my invention is to provide a scraper-forming machine capable of rapidly passing said discrete lengths of bar stock through the extrusion die, the present rate of production of my machine being 28 scrapers per minute.

Another important object of my invention is to provide a machine having a guideway and die, the guideway serving to guide the sheared bar stock into the die, and it is an important feature of my invention that both the guideway and the die of the machine may be quickly and easily changed so as to permit different size paraffin scrapers to be manufactured on the same machine with a minimum changeover time required, and also so as to permit both right-hand and left-hand spiral scrapers to be manufactured on the same machine with a minimum amount of work required for changing the machine to shape one type of scraper rather than the other type.

Another important object of my invention is to provide a novel extrusion die consisting of a core portion having a spiral extrusion slot therearound and a sleeve portion adapted to receive said core portion, said sleeve forming the outer wall of the spiral slot.

Another important object of my invention is to provide my machine with a power-driven means adapted to force the bar stock through the guideway and die, the discrete lengths of stock passing therethrough in mutual end-to-end relation. The power means may be either of the mechanical roller or linkage type, or may consist of an hydraulic ram adapted to force the discrete lengths of bar stock through the guideway and die.

Another important object of my invention is to provide means on the discharge end of the die, which means not only catches the scrapers as they emerge from the die but also groups the scrapers in nested or interwound relation, thereby nesting in each bundle approximately eleven scrapers, the scrapers then being removed from the catching and nesting means and being sent on to the heat-treating step.

My paraffin scrapers are presently being manufactured of 1095 spring steel and it is a very important object of my invention to provide a process including the step of heat-treating the formed scrapers to attain a Rockwell hardness of 43 so as to provide each scraper with the spring characteristics necessary to permit it to tightly grip the sucker rod on which it is to be installed.

Other objects and advantages of my invention will become apparent during the discussion of the drawings wherein:

Figure 1 is a front elevation of my scraper forming machine showing the bar stock entering the guideway at one end and being moved along the guideway by rollers which force the bar stock through the helical extrusion die and out onto the catcher rod whereon the successive scrapers are caught and interwound into nested relation.

Fig. 2 is a plan view of my helix-shaping machine.

Fig. 3 is a side elevation of the machine.

Fig. 4 is an enlarged section view of the helical extrusion die, the section being taken along lines 4—4 of Fig. 1.

Fig. 5 is an enlarged section view along lines 5—5 of Fig. 1.

Fig. 6 is a side elevation of one of the discrete lengths of bar stock showing one side thereof beveled at each end.

Fig. 7 is an elevation of one end of one of my spiral paraffin scrapers showing the structure of the end thereof, and more particularly showing the outer and inner peripheries of the scraper faired respectively inwardly and outwardly, dashed lines being employed to show a continuation of the general helical shape of the body to more clearly illustrate the fairing of the inner and outer peripheries of the scraper at its ends.

Referring to Figs. 1, 2 and 3, my helix-forming machine comprises a frame 1 having spaced front and rear upstanding portions 1a and 1b respectively. The frame members 1a—1b are used to journal four drive shafts 2, the upper two shafts 2 being connected for unitary rotation by chain drives 3, and the respective lower shafts being connected together for unitary rotation by chain drives 4, the upper and lower shafts being respectively driven by a pair of meshing gears 5.

I have provided a prime mover M driving the shafts 2 through reduction drives R so as to rotate the portions of the shafts 2 which extend forwardly through the front frame member 1a. On the front of the machine and journaled on the shafts 2 are respective upper rollers 6 and lower rollers 7, the upper rollers 6 each being spaced from the corresponding lower roller 7 by a distance slightly less than the thickness of the bar stock B which the rollers grip as it passes therebetween.

I have also provided screw adjustments 8 adapted to press the upper shafts 2 downwardly so as to force the upper rollers 6 in the direction of the lower rollers 7 to thereby tighten the grip of the respective rollers 6 and 7 on the bar stock B.

By inspection of Figs. 2 and 3 it will be seen that the outer peripheries of the respective rollers 6 and 7 are knurled for the purpose of insuring a nonskid grip between the rollers 6—7 and the bar stock B.

By reference to Figs. 1, 3 and 5 it will be seen that the frame 1a supports a guideway including upper and lower guide members 9 and an outer guide member 10, said guide members being transfixed by screws 11 holding the guide members in place against the frame 1a of the machine.

The guide members 9 and 10 are apertured as at 12, Fig. 1, in the vicinity of the respective rollers 6 and 7, said apertures permitting the rollers to extend inwardly into the guideway for the purpose of gripping the bar stock B and driving it through the guideway in a leftward direction as viewed in Fig. 1.

The lower guide member 9 extends rightwardly beyond the frame member 1a so as to provide a platform 9a to facilitate insertion of the bar stock B into the guideway. At the left end of the guideway is located a helical extrusion die secured to a mounting plate 13, which plate is bolted to the frame 1a of the machine as at 14. The die itself includes a sleeve 15 which is secured to the mounting plate 13 and which is provided with a bore which normally houses the core 16 of the die, the core 16 being maintained within the sleeve 15 by a set screw 17. As shown in Figs. 1 and 4, the core has a helical slot 16a which extends all the way through the core and communicates with each end thereof, the slot 16a and the bore walls within the sleeve 15 forming the walls of the helical extrusion die.

Referring to Fig. 1, it will be seen that the right end of the helical slot 16a communicates with the left end of the guideway and is axially aligned therewith so that the axis of the core 16 and of the sleeve 15 are disposed at an angle with respect to the horizontal guideway. The core 16 also has an axial bore 16b in which a catcher rod 18 is supported, the catcher rod extending upwardly and outwardly away from the machine and serving the purpose hereinafter discussed.

Having described the machine whereby the bar stock is formed into the helical paraffin scraper, I will now describe the process generally and include therein a description of the manner in which the extrusion machine itself operates.

*Process and operation*

In carrying out my process I use bar stock having the proper cross-sectional dimensions and having the proper metallurgical characteristics, the preferred stock being 1095 carbon steel. The bar stock is initially annealed and not hardened, and the first step of my process is to shear the bar stock into discrete lengths, generally about 24 inches, and at the same time that the bar stock is sheared into such lengths, the ends of the bar stock are provided with a bevel along one edge, as shown in Fig. 6 wherein the beveled edges are designated by the reference character E. In practice it has proved advantageous to cut the bar stock in such a way as to provide two adjacent beveled ends E in a single shearing operation, a small length of the bar stock between the two adjacent ends being wasted in each shearing operation.

After the bar stock is sheared to length and simultaneously provided with the beveled ends E, I then feed the bar stock B into the right end of the guideway of the helix-forming machine, Fig. 1. The longitudinal length of the guideway and the space between the respective pairs of rollers 6—7 is such that several discrete lengths of stock will be in the machine at the same time. That is to say, when one length of bar stock B is being fed into the right end of the machine there will be another length of the stock B in the center of the machine being gripped by the rollers, and still another length of bar stock B located further toward the left in the machine and within the helical slot of the extrusion die 15—16. The guideway feeds smoothly into the helical slot 16a so that each length of bar stock within the machine respectively transmits thrust to the length of bar stock imediately to its left. That is, the length of bar stock which is presently being driven leftwardly by the respective pairs of upper and lower rollers 6—7 will abut the end of the length of bar stock which has entered the helical extrusion die and will transmit thrust from the rollers to the length of stock located within the die.

In Figs. 1 and 2 it will be seen at the left of the machine that there is already one completely formed helical scraper S being supported on the catch rod 18 and that the end of a second helical scraper S' is emerging from the helical slot 16a and is beginning to interwind with the scraper S which is already completed and which is being supported on the catch rod 18. In practice it has been found that eleven scrapers may be caught and automatically interwound on the catch rod 18 before a complete bundle of nested scrapers is obtained. When the number of scrapers within the bundle has reached eleven, it is then necessary for the bundle to be removed from the catch rod 18 either by an attendant or by a mechanical conveyor, the bundle being ready to be transferred from the catch rod 18 to the heat-treating step of the process. The helix-forming machine runs continuously and extrudes scrapers from the die 15—16 at the rate of about 28 per minute.

One of the principal features of novelty of my invention is found in the manner in which the extrusion die 15—16 shapes both the outer and inner peripheries of the scraper in the vicinity of the respective ends thereof. By inspection of Figs. 2 and 6 it will be seen that the bar stock B is sheared so that only one edge thereof is beveled, the beveled portion being designated by the reference character E, Fig. 6.

Upon inspection of Fig. 2 it will be seen, however, that the beveled portion E of the bar stock, as the latter enters the extrusion slot 16a of the die, faces inwardly toward the axis of the die so that the edge F at the end of the bar will be the first edge to make contact with that portion of the inner surface of the sleeve 15 which lies opposite the extrusion slot 16a. Therefore both the first and the last stressing forces to be applied to the bar stock B will be applied at the respective points F, which application of pressure will be sufficient to cause the ends of the bar stock B in the vicinity of the beveled portion E to be bent inwardly toward the center of the helix through a short distance.

By reference to Fig. 7 it will be seen that the outer periphery of the scraper at the end thereof is faired inwardly at as F' and that the inner periphery of each end of the scraper is faired outwardly as at E'. Although the initial bevel E which is sheared on each and of the bar stock B makes an angle of about 10 degrees with the axis of the bar stock, when the bar stock has been put through the die and has been formed into a paraffin scraper, the angle of the surface E' is considerably less than 10 degrees as a result of the fact that some of that angle has been transferred to the outer periphery of the scraper in the vicinity of the inwardly-faired portion F'.

The inside diameter of the helical slot 16a is made somewhat smaller than the diameter of the sucker rod on which the spiral scraper is intended to be used, and therefore the spiral scraper S has an inner peripheral diameter which is normally smaller than the diameter of the sucker rod.

The final step in my process is to heat-treat the formed scrapers so as to provide them with springlike characteristics, the scrappers after having been heat-treated having a Rockwell hardness of 43 so that when they are installed on the sucker rods which they are intended to fit they will tightly grip the sucker rods as a result of the fact that their normal diameters are somewhat smaller than the diameter of the sucker rod and as a result of the spring characteristics with which they have been provided during the heat-treating step of the process.

I do not limit my invention to the showing made in the drawings for obviously changes may be made within the scope of the appended claims.

I claim:

1. The process of making helical paraffin scrapers having the respective ends thereof faired both radially inwardly and radially outwardly from bar stock of generally rectangular cross-section including the following steps: cutting the bar stock into discrete lengths and bevelling one edge of the stock at each end thereof inwardly; forcing said lengths through an enclosed helical die, said lengths being introduced into said die with the beveled edge disposed inwardly toward the axis of the die whereby the ends of the edge opposite said beveled edge will be bent inwardly toward the axis of the die by the outer helical surface of the die; and heat treating the formed scrapers to provide them with hardened spring characteristics.

2. The process of making helical paraffin scrapers having the respective ends thereof faired both radially inwardly and radially outwardly from annealed bar stock of generally rectangular cross-section including the following steps: cutting the bar stock into discrete lengths and bevelling one edge of the stock at each end thereof inwardly; forcing said lengths through an enclosed helical die, said lengths being introduced into said die with the beveled edge disposed inwardly toward the axis of the die whereby the ends of the edge opposite said beveled edge will be bent inwardly toward the axis of the die by the outer helical surface of the die; catching the helically formed scrapers and mutually interwinding the latter as they emerge from the die; and heat treating the interwound scrapers to provide them with hardened spring characteristics.

3. The process of making helical paraffin scrapers from bar stock including the following steps: shearing the bar stock to discrete lengths; forcing said lengths end to end through an enclosed helical die; catching the helically formed scrapers in mutually interwound relation as they emerge from the die; and heat treating the interwound scrapers to provide them with hardened spring characteristics.

4. A machine for forming rectangular bar stock lengths into helical paraffin scrapers for use on a sucker rod comprising, a frame: a guideway fixed to said frame, the cross-sectional dimensions of said guideway being sufficient to snugly pass said bar stock lengths; an extrusion die having a helical path therethrough, the inside diameter of said path being less than the diameter of said sucker rod and the path having four walls along its full length to completely confine the bar stock, and the die being fixed to said frame with one end of its helical path axially aligned with one end of said guideway; and drive means in the guideway for forcing said bar stock lengths through said guideway and said die with the narrower edges of the bar stock against the inner and outer peripheries of the die, said lengths emerging as helixes from the discharge end of said die.

5. In a device as set forth in claim 4, the axis of said die being disposed diagonally upwardly; and a catcher rod fixed to said die at the discharge end thereof and disposed axially of said die, said rod catching the helical scrapers as they emerge from the die and nesting them in interwound relation.

6. In a device as set forth in claim 4, said guideway being enclosed and being longer than one of said lengths and opposite sides of said guideway being apertured; and said drive means comprising at least two opposed pairs of power-driven rollers in said guideway at said apertures said pairs being spaced apart less than one bar stock length, the spacing between the rollers of the respective pairs being adjustable to provide sufficient grip between said rollers and said bar stock to drive the latter through said die.

7. In a device as set forth in claim 4, said extrusion die comprising a core portion and a sleeve portion, the former fitting into the latter and the core portion having a helical slot around its outer periphery which slot is closed by the sleeve portion, intermediate the ends of the die to form a helical extrusion path.

References Cited in the file of this patent

UNITED STATES PATENTS

| | | |
|---|---|---|
| 1,123,518 | Gillespie | Jan. 5, 1915 |
| 1,779,131 | Holness | Oct. 21, 1930 |
| 2,062,552 | Burgess | Dec. 1, 1936 |
| 2,314,151 | Macklin | Mar. 16, 1943 |
| 2,365,953 | Hauton | Dec. 26, 1944 |
| 2,377,950 | McMinn | June 12, 1945 |
| 2,555,310 | Beltz | June 5, 1951 |